Aug. 21, 1934.  C. S. JENNINGS  1,971,142
PNEUMATIC DISPATCH SYSTEM
Filed Oct. 16, 1931   6 Sheets-Sheet 1
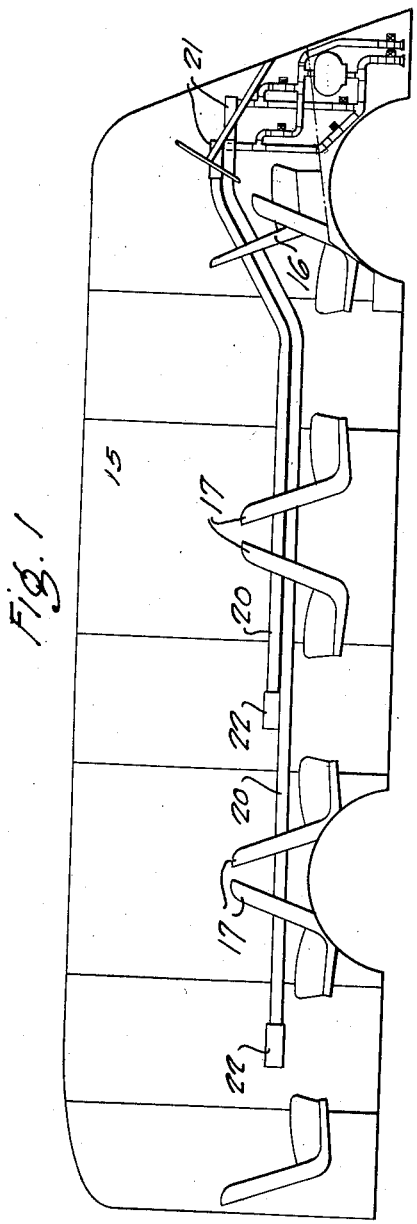
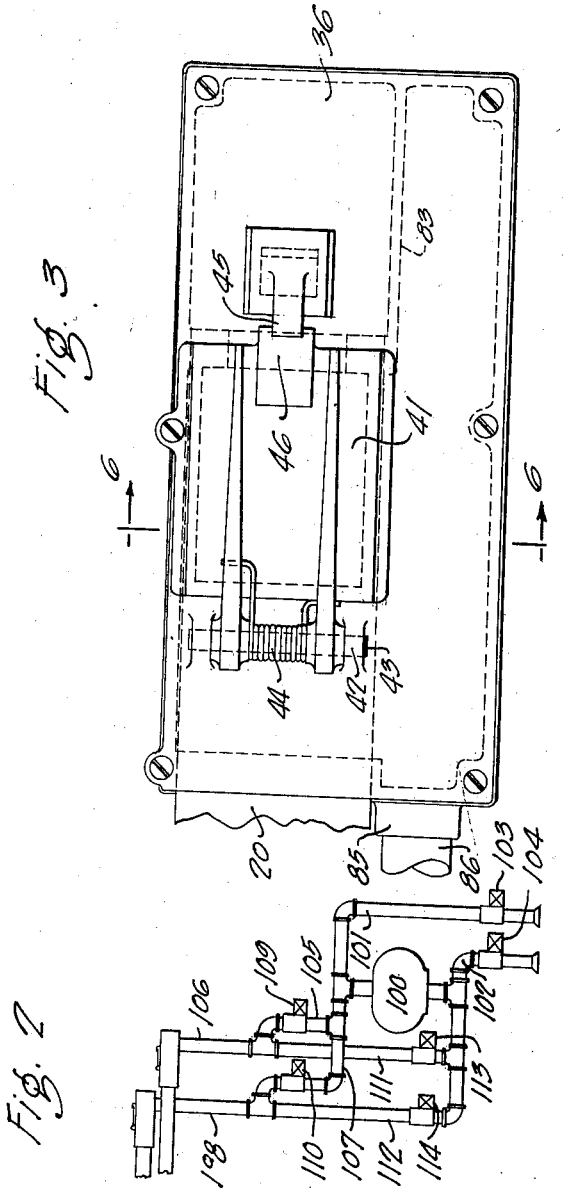
INVENTOR
CHESTER S. JENNINGS
by Roberts, Cushman & Woodberry
ATTYS INVENTOR
CHESTER S. JENNINGS
by Roberts, Cushman & Woodbury
ATT'YS Aug. 21, 1934.  C. S. JENNINGS  1,971,142
PNEUMATIC DISPATCH SYSTEM
Filed Oct. 16, 1931  6 Sheets-Sheet 3
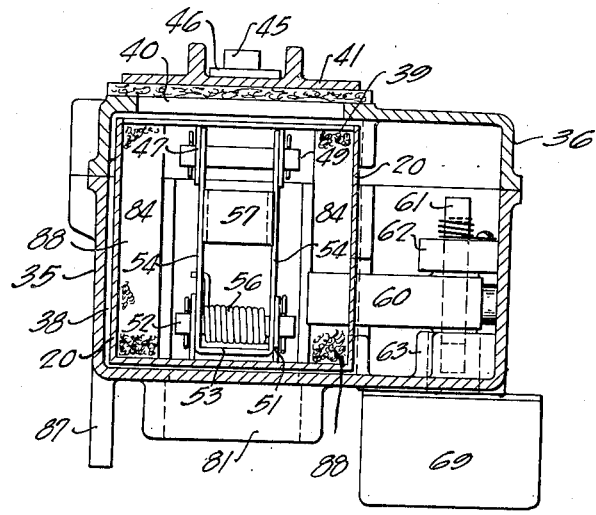
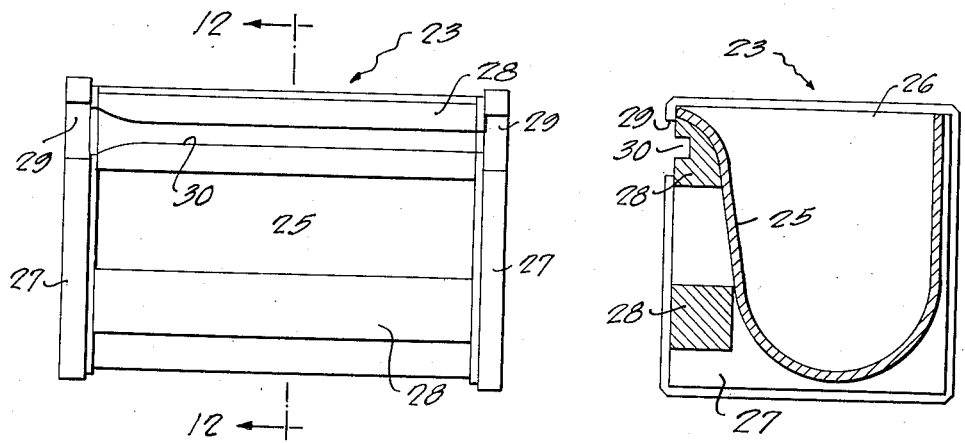
INVENTOR
CHESTER S. JENNINGS
by Roberts, Cushman & Woodbury.
ATT'YS Aug. 21, 1934.   C. S. JENNINGS   1,971,142
PNEUMATIC DISPATCH SYSTEM
Filed Oct. 16, 1931   6 Sheets-Sheet 4

INVENTOR
CHESTER S. JENNINGS
by Roberts, Cushman & Woodbury.
ATT'YS

Aug. 21, 1934.  C. S. JENNINGS  1,971,142
PNEUMATIC DISPATCH SYSTEM
Filed Oct. 16, 1931  6 Sheets-Sheet 5

INVENTOR
CHESTER S. JENNINGS
by Roberts, Cushman & Woodbury
ATT'YS

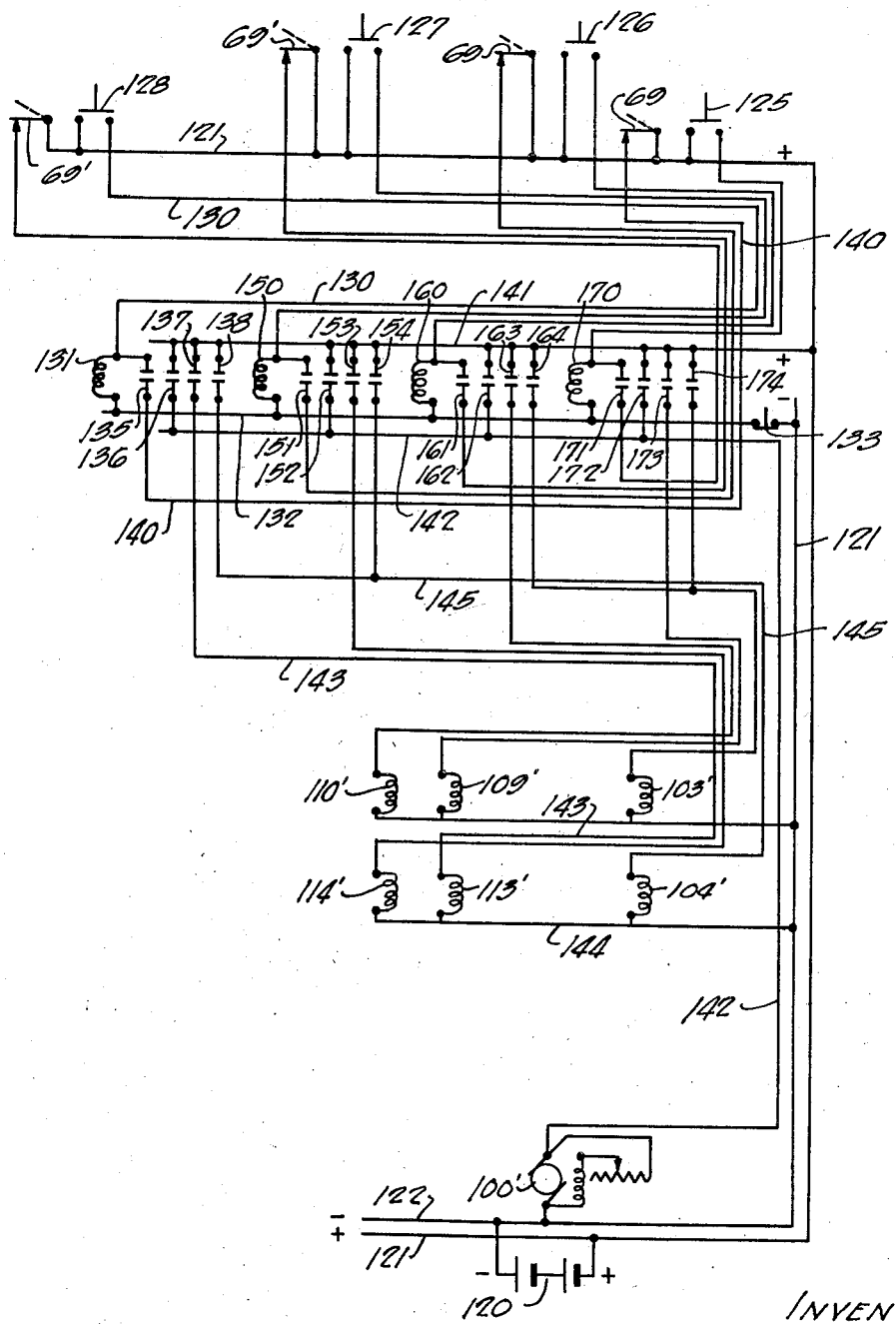

Patented Aug. 21, 1934

1,971,142

UNITED STATES PATENT OFFICE 1,971,142

PNEUMATIC DISPATCH SYSTEM

Chester S. Jennings, Syracuse, N. Y., assignor to The Lamson Company, Syracuse, N. Y., a corporation of Massachusetts Application October 16, 1931, Serial No. 569,156

10 Claims. (Cl. 243—1)

This invention relates to an improvement in a pneumatic dispatch system and has for its primary object to provide a system in which the carrier remains at all times in the tube in contradistinction to the systems heretofore in use in each of which the carrier is discharged from the tube into a terminal and taken therefrom for removal of the contents, or for other manipulation.

Other objects will appear from a consideration of the following description of one embodiment of this invention and of the drawings which form a part thereof and in which Fig. 1 is a diagrammatic view illustrating a bus in which is installed one embodiment of this invention;

Fig. 2 is a diagram illustrating the arrangement of pipes by which the desired flow of air is set up in the system;

Fig. 3 is a plan view of a terminal at the driver's station;

Fig. 6 is a sectional view taken along the line 6—6 of Fig. 3;

Fig. 11 is a view in elevation of a carrier adapted to be used in this system;

Fig. 12 is a sectional view of the carrier taken along the line 12—12 of Fig. 11; and Fig. 13 is a wiring diagram illustrating one form of electric wiring by which this system may be operated.

Figure 5:
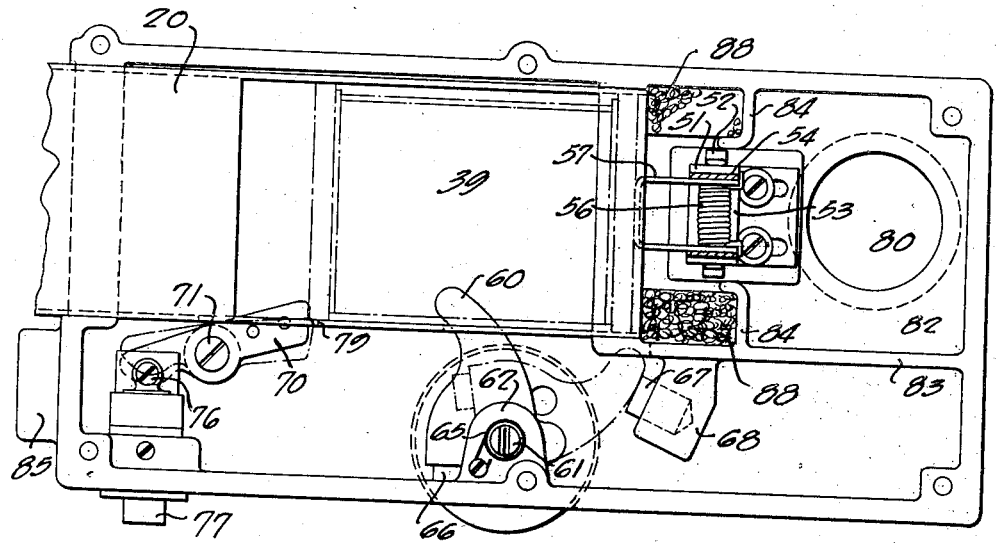
Fig. 5 is a plan view of the terminal shown in Fig. 3, the cover being removed, one element being shown in section and a carrier being indicated by dotted lines in the terminal.

One use of a system embodying this invention is in a motor bus or other vehicle whereby passengers can, without leaving their seats and while the bus is in motion, obtain change or tickets from the driver so that upon reaching their destinations they can alight quickly and not delay the bus unduly. This particular embodiment has been selected for the purpose of illustrating the invention and will be described in detail. It will be understood however that the invention is not limited thereto and that the various features herein described may be used advantageously in various pneumatic tube systems.

The system, shown installed in a bus 15 having a driver's seat 16 and passengers' seats 17 comprises briefly one or more tubes 20 (two being here shown) each tube connecting two stations, which, for purpose of convenience in describing this embodiment, will be here designated as the driver's station having a terminal 21 for each tube and the passengers' stations each having a terminal 22, a carrier 23 for each tube, which carrier remains in its tube at all times, and means for creating a flow of air through any tube for the purpose of transporting the carrier in either direction through the tube.

The tubes are preferably non-circular in cross section and the carriers are similarly formed so that any tendency of the carrier to rotate on its own axis is prevented. In the selected embodiment the tubes and carriers are rectangular but other conformations could be selected. The carrier (see Figs. 11 and 12) comprises a trough shaped body member 25, the opening 26 being at the top, closed at the ends by rectangular walls 27. Longitudinally extending blocks 28 brace the inner wall of the member 25 and are suitably secured to the walls 27. In the inner edge of each wall 27 near the top of the carrier is formed a notch 29 which registers with a longitudinally extending slot 30 in the upper block 28, said slot acting to prevent the removal of the carrier at the passengers' station as will be described hereinbelow.

Each terminal 21 at the driver's station comprises a lower box 35 and a cover 36 removably secured thereto. The box and cover are open at the rear end of the terminal to receive one end of the tube 20 which extends into the terminal to the point 37 where it engages shoulders 38 formed in the box and cover. The upper wall of the tube is cut away within the station to provide an opening 39 which registers with an opening 40 in the cover 36 (see Fig. 4). The opening 40 is adapted to be normally closed by a cover here shown as lid 41 hinged at the rear end to ears 42 on the cover 36 by a rod 43. A spring 44 coiled around the rod 43 normally tends to raise the lid which is held closed by a latch 45 engaging a plate 46 projecting from the free end of the lid. In accordance with the usual practice the lid 41 includes pad of leather, felt or other suitable material by which the opening 40 is sealed to prevent the entry or escape of air from the terminal.

Figure 4:
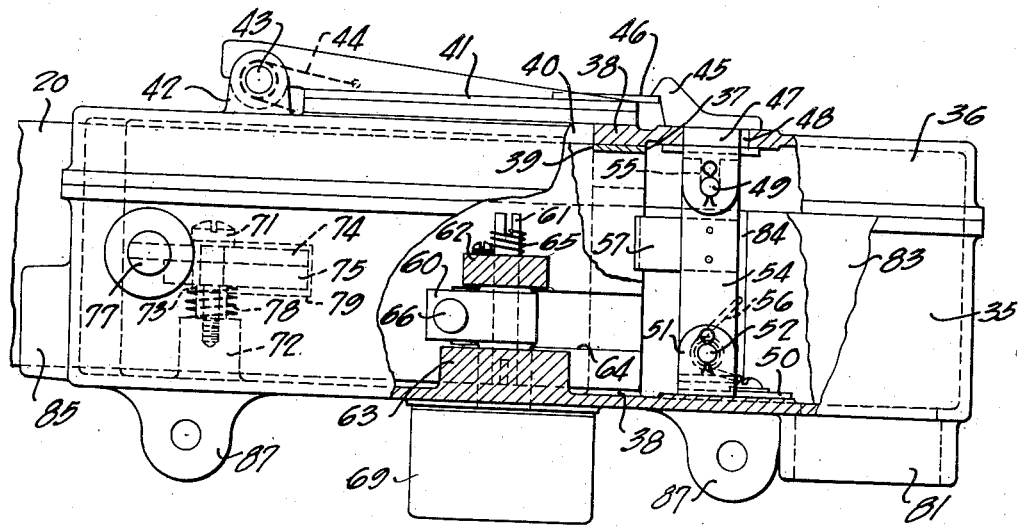
Fig. 4 is a side elevation of such terminal with parts broken away.
Figure 7:
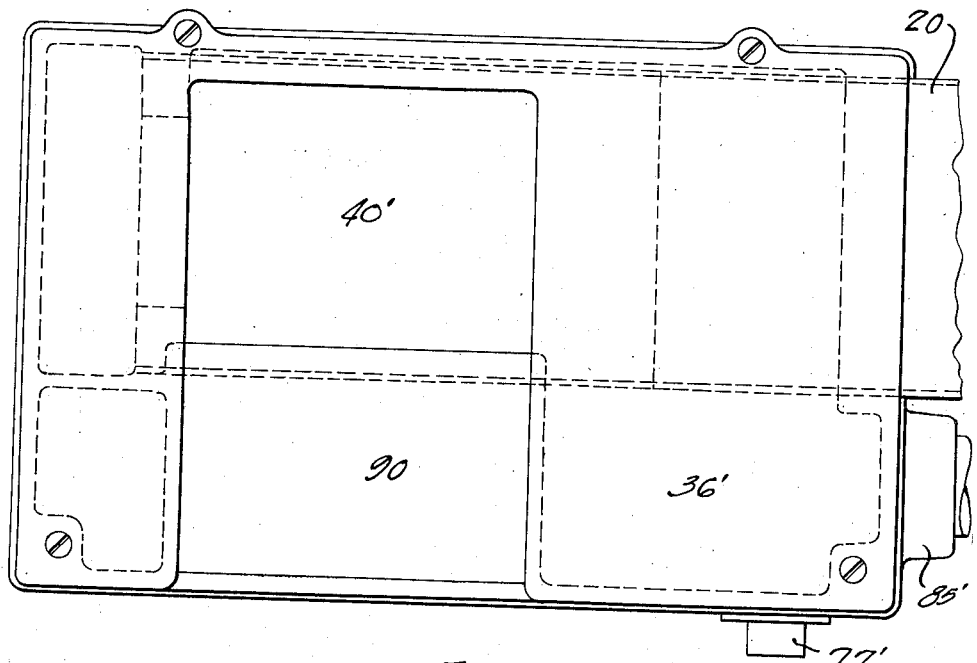
Fig. 7 is a plan view of one of the terminals at the passenger's station of the system.
Figure 8:
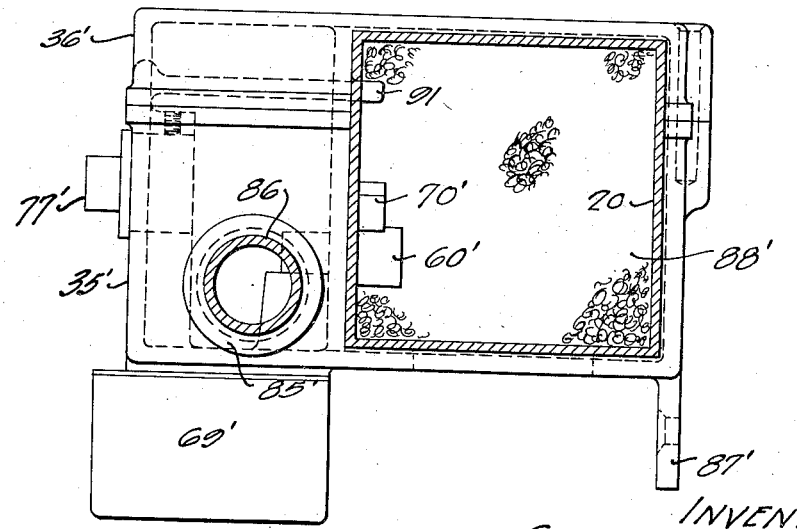
Fig. 8 is an end elevation of that terminal taken from the right in Fig. 7, the tube being in section.
Figure 10:
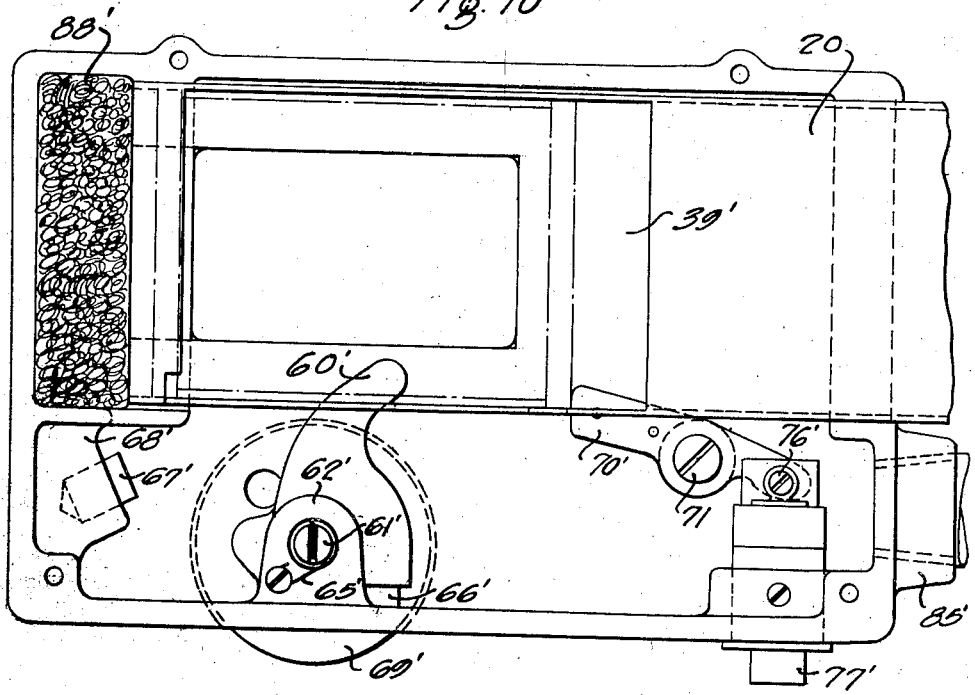
Fig. 10 is a plan view of the terminal with the cover removed and a carrier shown therein in dotted lines.
Figure 9:
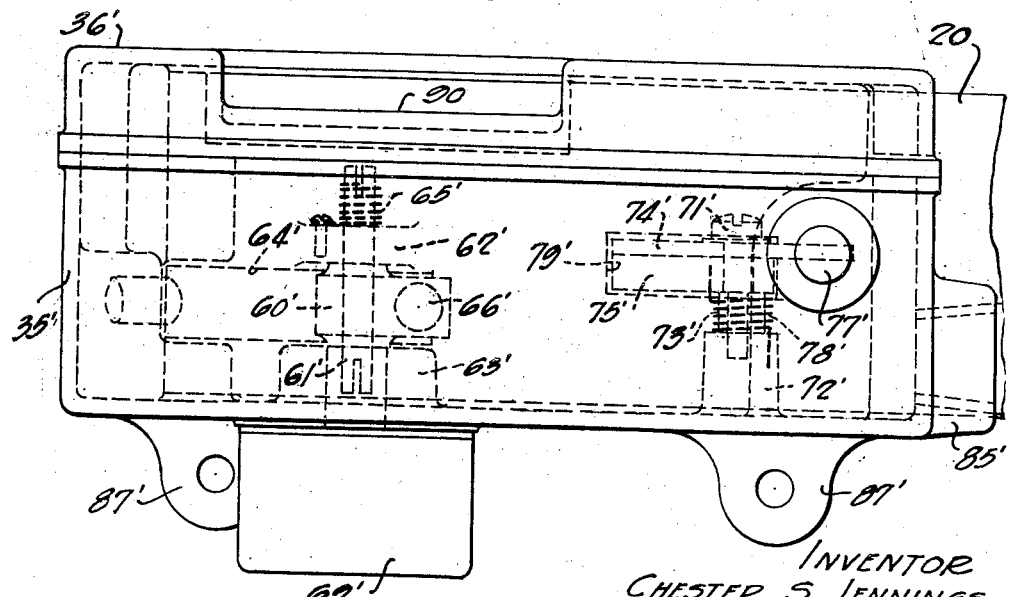
Fig. 9 is a side elevation of such terminal.

The latch 45 is suitably mounted and except under conditions set forth below assumes the position shown in Fig. 4. Secured to the underside of the latch 45 is a U-shaped plate 47 which passes through an opening 48 in the cover and carries a rod 49 connecting the legs thereof. Fixed to a plate 50 adjustably attached to the bottom of the box 35 is a second U-shaped plate 51 the ends of which support a rod 52. Pivotally mounted upon the rod 52 is a U-shaped link 53 the legs 54 of which terminate in slots 55 which receive the rod 49. A spring 56 surrounding the rod 52 normally acts upon the legs 54 to hold the latch and its associated elements in the position shown in Fig. 4. Rigidly attached to the legs 54 is a U-shaped trip 57 which projects slightly into the tube 20 so that it will be contacted by the forward wall of a carrier in the terminal and forced back against the action of the spring 56 to shift the latch 45 and release the lid 41.

The terminal 21 also includes an arm 60 which reduces the speed of travel of the carrier as it reaches the end of its travel and a latch 70 which holds the carrier in the terminal. The arm 60 is fixed upon a rock shaft 61 carried by an ear 62 projecting from the inner wall of the box 35 and a boss 63 projecting from the bottom of the box. The arm 60 normally projects through a slot 64 in the wall of the tube 20 into the path of travel of the carrier and is held by a spring 65 in such position. A bumper 66 carried by the arm 60 bears against the side wall of the box to limit the movement imparted by the spring. Under impact of the approaching carrier the arm is swung out of the tube against a bumper 67 carried by a bracket 68 on an internal wall of the box. The shaft 61 is connected to and actuates in any well known manner a circuit breaker 69 the operation of which will be set forth below. The latch 70 is pivoted upon a set screw 71 which enters a boss 72 on the bottom of the box and rests upon a sleeve 73 surrounding the screw 71. As shown in Fig. 4 the latch 70 comprises an upper plate 74 of fiber and a lower plate 75 of steel or hard metal the plates being connected by screws or rivets as indicated in Fig. 5. The plate 74 is attached by a screw 76 to a reciprocable button 77 one end of which projects beyond the side wall of the box. A spring 78 holds the latch 70 normally in the position indicated in full lines in Fig. 5 in which it projects through a slot 79 in the side wall of the tube 20 into the path of travel of the carrier and prevents the carrier from leaving the terminal until released.

The transporting air is forced into or withdrawn from the system at the driver's station by a passage 80 through a boss 81 which leads into a compartment 82 formed in the box 35 by the front and outer walls thereof, the internal wall 83 which carries the bracket 68 and a pair of rear walls 84 which define a passage leading to the tube 20. A boss 85 on the rear wall of the box receives one end of a tube 86 which contains electric cables or wires for the operation of the system set forth below. Ears 87 projecting from the box facilitate the mounting of the terminal upon the bus and felt bumpers 88 stop the carrier.

The terminal 22 at each passenger's station corresponds in many respects to the terminal 21 at the driver's station just described and comprises a box 35' and a cover 36' removably secured together and open at the forward end of the terminal to receive the end of the tube 20. A part of the upper wall of the tube is removed to provide the opening 39' which registers with the opening 40' in the cover. The opening 40' however instead of being closed by a lid as is the opening 40, is open at all times to the atmosphere to permit the entry of air to or the escape of air from the tube. The carrier upon its arrival at the terminal is retarded by the arm 60' and is held in position therein by the latch 70'. The arm 60' and latch 70' are mounted and operated in the same manner as the arm 60 and latch 70 of the terminal at the driver's station and reference characters which are primes of the corresponding characters will be applied to the drawings without any detail description herein. A boss 85' at the forward end of the box 35' receives the end of the tube 86 and the terminal is secured in place by the use of the ears 87'.

At the side of the opening 40' in the cover 36' is provided a shelf or ledge 90 formed preferably integral with the cover, a suitable depression being made therein. The edge 91 of the shelf projects through a slot in the tube 20 into the path of travel of the carrier and is so located that it enters the slot 30 therein and thus prevents the raising or removal of the carrier in the tube. A bumper 88' stops the forward travel of the carrier.

In the present embodiment air pressure is used to propel the carriers from the terminals at the driver's station to the terminals at the respective passenger's stations and vacuum is employed to impel the carriers from the passenger's stations to the driver's station. Such air flow is furnished by a blower 100 through any suitable arrangement of pipes and valves as for example that shown in Figs. 1 and 2. The blower 100 which is shown diagrammatically, may be of any desired power driven type and is connected to the atmosphere from its outlet by a pipe 101 and from its inlet by a pipe 102, each pipe being provided with a normally open valve designated as 103, 104 respectively. The pipe 101 is connected to the lower terminal at the driver's station by pipes 105 and 106, and to the upper terminal by pipes 107 and 108, the pipes 105 and 107 being provided with normally closed valves 109, 110 respectively. The pipe 102 is similarly connected to the lower terminal through an extension 111 of the pipe 106 and to the upper terminal through an extension 112 of the pipe 108, and normally closed valves 113 and 114 respectively are provided in such extensions. From the above description and a consideration of Fig. 2 the following will be apparent. When air under pressure is to be supplied to the system the valve 103 is closed and either the valve 109 opened if the lower terminal is to be supplied or the valve 110 opened if the upper terminal is to be supplied so that air drawn from the atmosphere through the pipe 102, the valve 104 being open, will be directed to the proper terminal, to transport the carrier through the tube and escape through the opening at the passengers' station terminal. If on the contrary vacuum or negative pressure is to be set up in the system the valve 104 is closed, the valve 103 being open, and the valve 113 or the valve 114 opened according to the terminal desired, so that air drawn through the opening 40' at the terminal 22 of the passengers' station, will transport the carrier to the driver's station and escape through the blower and the pipe 101 to the atmosphere. The supply of air under positive pressure to transport carriers to the passengers' stations is controlled by the driver and the supply of air under negative pressure to transport carriers to the driver's station is controlled by the passenger.

Fig. 13 illustrates diagrammatically one system of wiring by which such controls can be carried out electrically. The reference numeral 100' is applied to the motor by which the blower 100 is driven and the reference numerals 103', 104', 109', 110', 113', and 114' are applied to the magnets or coils by which the valves 103, 104, 109, 110, 113 and 114 respectively are controlled. A battery or other source of current 120 is connected across the main lead lines 121 and 122 it being assumed for the purpose of description that current flows from the battery through lead 121 and returns through lead 122. At each terminal of each tube is provided a normally open switch of any suitable type such switches being designated on Fig. 13 as 125, 126, 127 and 128 respectively. It will be understood that the switches 125 and 126 are at the terminals of the driver's station and the switches 127 and 128 are at the terminals of the passengers' stations. It will be also understood as indicated on the drawings that the switches 125 and 128 relate to the lower tube and terminals and the switches 127 and 128 relate to the upper tube and terminals.

Assuming for example that a passenger desires to make change or purchase tickets from the driver and uses the lower tube 20, he first places the necessary money in the carrier at the terminal 22, the carrier being at all times unless in use at such terminal, and then presses the button 77' to release the carrier and at the same time closes the switch 128. The closing of the switch completes a circuit from the main lead 121, through lead 130, magnet 131, lead 132 and safety switch 133 (normally closed) to the main lead 122. The magnet 131 is one element of a relay which includes switches 135, 136, 137 and 138 all of which are simultaneously closed when the magnet is energized. The switch 135 completes a holding circuit from the main lead 121, circuit breaker 69 at the destination terminal, lead 140 to the magnet 131 so that the switch 128 may be released without affecting the further operations of the system. Closure of the switch 136 completes a circuit from the main lead 121, through lead 141, switch 135, and lead 142 to energize the motor 100' and set the blower 100 into operation. The switch 137 similarly completes a circuit from the lead 141 to lead 143, coil 113' and lead 144 to open the valve 113 while switch 138 closes the circuit from lead 141 to lead 145, coil 104' and lead 144 to close the valve 104. The circuits thus described are maintained until the carrier arriving at its destination terminal trips the arm 60 and opens the circuit breaker 69 whereupon the magnet 131 is deenergized and the switches 135, 136, 137 and 138 are opened to restore the system to its normal inoperative condition.

If the passenger should use the upper tube 30 the same operations would be performed. The closure of the switch 127 would energize the magnet 150, closing the switches 151, 152, 153 and 154. The switch 151 completes the holding circuit through circuit breaker 69 at the destination terminal, the switch 152 sets the motor 100' in operation, the switch 153 opens the valve 114 and the switch 154 closes the valve 104, a condition which is maintained until the holding circuit is broken upon the arrival of the carrier at the destination terminal and the tripping thereby of the circuit breaker at such terminal. Similarly the switch 126 when closed energizes the magnet 160 and closes switches 161, 162, 163 and 164 and the switch 125 when closed energizes the magnet 170 and closes the switches 171, 172, 173 and 174. The closure of the switches in each instance has certain functions, to wit, completing the holding circuit, setting the blower motor in operation, opening the proper normally closed valve and closing the proper normally open valve, such conditions being maintained until the holding circuit is broken in the manner specified above.

While one embodiment of this invention has been shown and described I am not limited thereto since other embodiments can be made without departing from the spirit and scope of the invention as set forth in the following claims.

I claim:

1. In a pneumatic dispatch system comprising terminals and a transit tube connecting said terminals, said tube being non-circular in cross section to receive and transport between the terminals a carrier similar in conformation, said carrier having an opening in one side wall thereof and each of said terminals having an opening therein, the opening in said carrier being brought into registration with the opening in each terminal upon its arrival thereat whereby access to the interior of the carrier may be had without removing the carrier from the system.

2. In a pneumatic dispatch system including a terminal and a transit tube by which a carrier is delivered to and dispatched from the terminal, said carrier having a slot along one wall thereof and said terminal having an opening therein through which access may be had to the interior of the carrier, means at said terminal projecting into the path of travel of the carrier and engaging the slot therein to prevent the removal of the carrier from the terminal.

3. In a pneumatic dispatch system including a terminal and a transit tube by which a carrier is delivered to and dispatched from the terminal, said carrier having a slot along one wall thereof and said terminal having an opening therein through which access may be had to the interior of the carrier, a ledge in said terminal, the edge of which projects into the path of travel of the carrier and engages the slot therein to prevent the removal of the carrier from the terminal.

4. In a pneumatic dispatch system including a terminal and a transit tube by which a carrier is delivered to and dispatched from the terminal, said carrier having a slot extending longitudinally along one wall thereof and said terminal having an opening therein through which access may be had to the interior of the carrier, means at said terminal projecting into the path of travel of the carrier and engaging the slot in the carrier to prevent the removal of the carrier from the terminal.

5. In a pneumatic dispatch system including a terminal and a transit tube by which a carrier is delivered to and dispatched from the terminal, said carrier having a slot extending longitudinally along one wall thereof and said terminal having an opening therein through which access may be had to the interior of the carrier, means at said terminal projecting into the path of travel of the carrier and engaging the slot in the carrier to prevent the removal of the carrier from the terminal through the opening therein.

6. In a pneumatic dispatch system including a terminal and a transit tube by which a carrier is delivered to and dispatched from the terminal, said terminal having an opening therein, through which access may be had to the interior of the carrier, a cover normally closing said opening and means actuated by the carrier upon its arrival at such terminal for opening said cover, said carrier remaining at all times within the terminal or tube.

7. In a pneumatic dispatch system including a terminal and a transit tube by which a carrier is delivered to and dispatched from the terminal, said terminal having an opening therein through which access may be had to the interior of the carrier, a cover normally closing said opening, a trip in said terminal in the path of travel of the carrier which trip is actuated by the carrier upon its arrival at the terminal and means controlled by said trip for opening said cover, said carrier remaining at all times within the terminal or tube.

8. In a pneumatic dispatch system including a terminal and a transit tube by which a carrier is delivered to and dispatched from the terminal, said terminal having an opening therein through which access may be had to the interior of the carrier, a cover normally closing said opening, a latch for holding said cover in the closing position and means actuated by the carrier upon its arrival at the terminal for causing said latch to release the cover, said carrier remaining at all times within the terminal or tube.

9. In a pneumatic dispatch system including a terminal and a transit tube by which a carrier is delivered to and dispatched from the terminal, said terminal having an opening therein through which access may be had to the interior of the carrier, a cover normally closing said opening, a latch for holding said cover in the closing position, and means causing the latch to release the cover upon the arrival at the terminal of the carrier, said carrier remaining at all times within the terminal or tube.

10. In a pneumatic dispatch system including a terminal and a transit tube by which a carrier is delivered to and dispatched from the terminal, said terminal having an opening therein through which access may be had to the interior of the carrier, a cover normally closing said opening, said cover when open, preventing the dispatch of the carrier from the terminal, said carrier remaining at all times within the terminal or tube.

CHESTER S. JENNINGS.